(12) United States Patent
Palanisamy et al.

(10) Patent No.: US 9,584,614 B2
(45) Date of Patent: Feb. 28, 2017

(54) METHOD AND SYSTEM FOR MIGRATING AN INTERFACE

(71) Applicants: Sankara Subramanian Palanisamy, Bangalore (IN); Anand Krishnamurthy, Karnataka (IN)

(72) Inventors: Sankara Subramanian Palanisamy, Bangalore (IN); Anand Krishnamurthy, Karnataka (IN)

(73) Assignee: WIPRO LIMITED, Bangalore (IN)

( * ) Notice: Subject to any disclaimer, the term of this patent is extended or adjusted under 35 U.S.C. 154(b) by 250 days.

(21) Appl. No.: 14/593,482

(22) Filed: Jan. 9, 2015

(65) Prior Publication Data

US 2016/0205211 A1 Jul. 14, 2016

(30) Foreign Application Priority Data

Nov. 21, 2014 (IN) ............................ 5840/CHE/2014

(51) Int. Cl.
*H04L 29/08* (2006.01)

(52) U.S. Cl.
CPC ...... *H04L 67/2809* (2013.01); *H04L 67/2842* (2013.01); *H04L 67/34* (2013.01)

(58) Field of Classification Search
CPC .................................................. H04L 67/2809
See application file for complete search history.

(56) References Cited

U.S. PATENT DOCUMENTS

| | | | |
|---|---|---|---|
| 5,970,490 A * | 10/1999 | Morgenstern | G06F 17/30569 |
| 2005/0243604 A1 | 11/2005 | Harken et al. | |
| 2005/0251533 A1 | 11/2005 | Harken et al. | |
| 2011/0213883 A1 * | 9/2011 | Athey | G06Q 10/06 709/226 |
| 2011/0252403 A1 * | 10/2011 | Joukov | G06F 9/4856 717/121 |
| 2012/0095957 A1 * | 4/2012 | Reddy | G06F 17/30566 707/602 |
| 2014/0164607 A1 * | 6/2014 | Bai | H04L 43/045 709/224 |
| 2016/0092330 A1 * | 3/2016 | Kosuda | G06F 11/263 714/33 |
| 2016/0205211 A1 * | 7/2016 | Palanisamy | H04L 67/2809 709/202 |

* cited by examiner

*Primary Examiner* — Jerry Dennison
(74) *Attorney, Agent, or Firm* — Finnegan, Henderson, Farabow, Garrett & Dunner, LLP

(57) ABSTRACT

Embodiments of this disclosure relate to methods and systems for migrating an interface. One disclosed method may include discovering types associated with a plurality of source middleware nodes, and discovering one or more links between them. It may include mapping the plurality of source middleware nodes to nodes of a global middleware model based on the types, wherein the global middleware model comprises a format interoperable between a source middleware platform and a target middleware platform. It may further include establishing one or more links between the nodes of the global middleware model based on the one or more links between the plurality of source middleware nodes. It may also include migrating the nodes of the global middleware model and the one or more links between the nodes of the global middleware model to the target middleware platform based on mapping the global middleware model to the target middleware platform.

20 Claims, 5 Drawing Sheets

Exemplary Method for Migrating Middleware Components

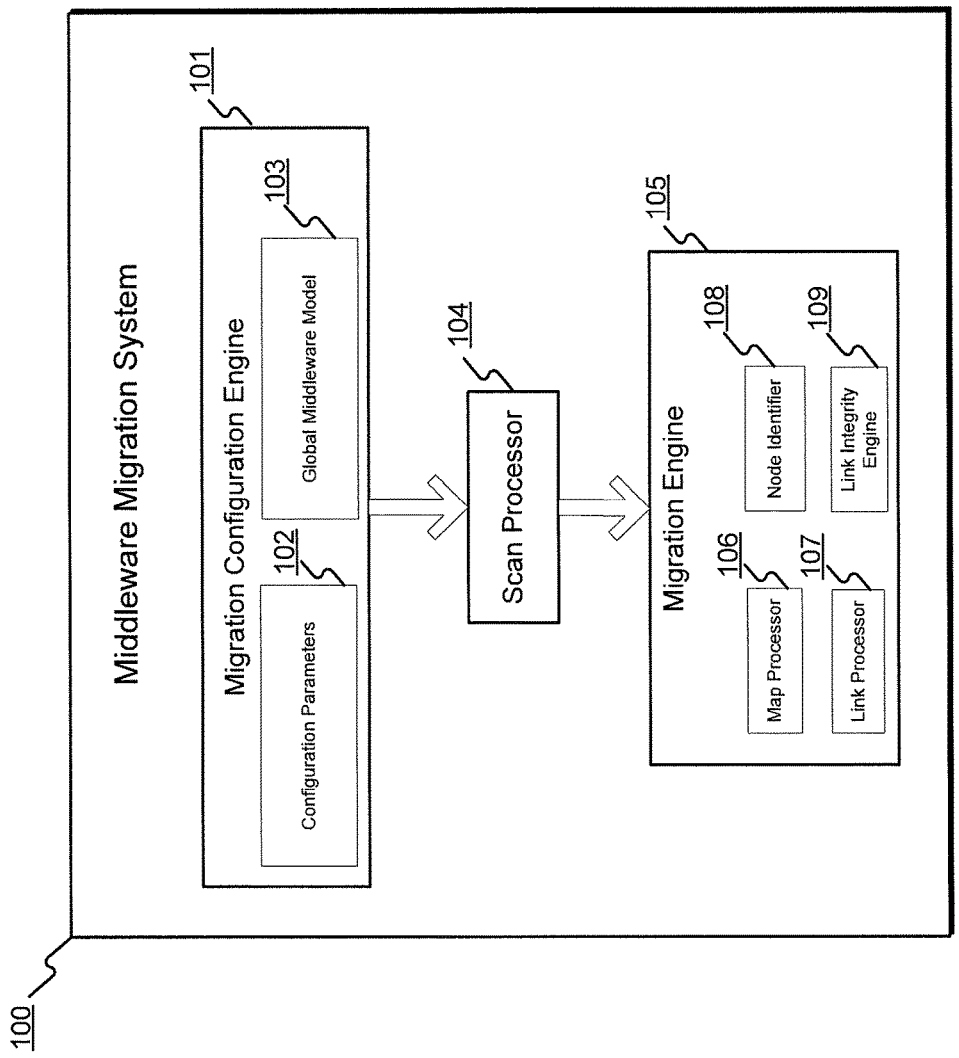
FIG. 1: Exemplary Middleware Migration System

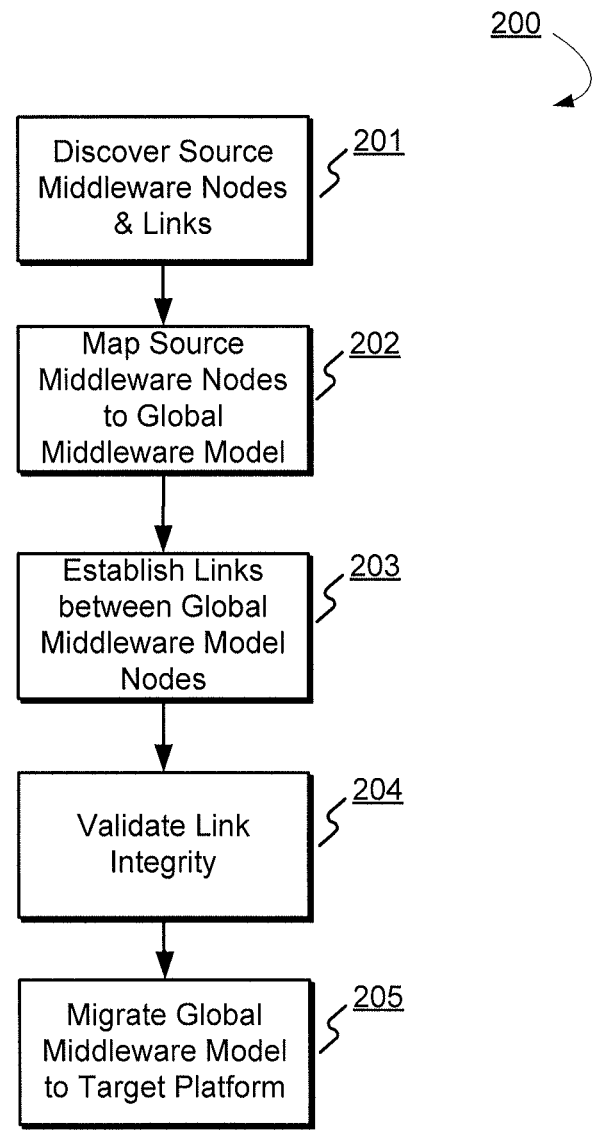
FIG. 2: Exemplary Method for Migrating Middleware Components

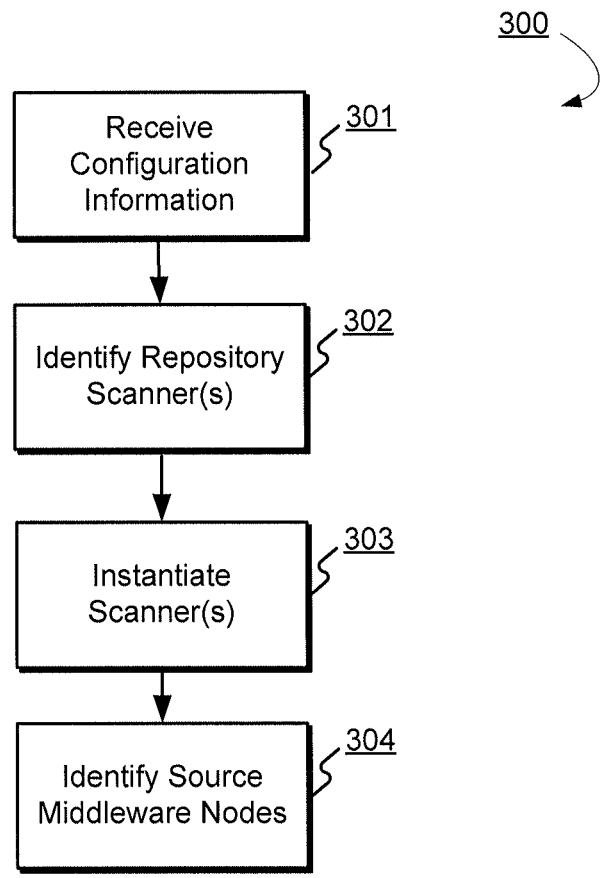
FIG. 3: Exemplary Method for Discovering Middleware Components and Links

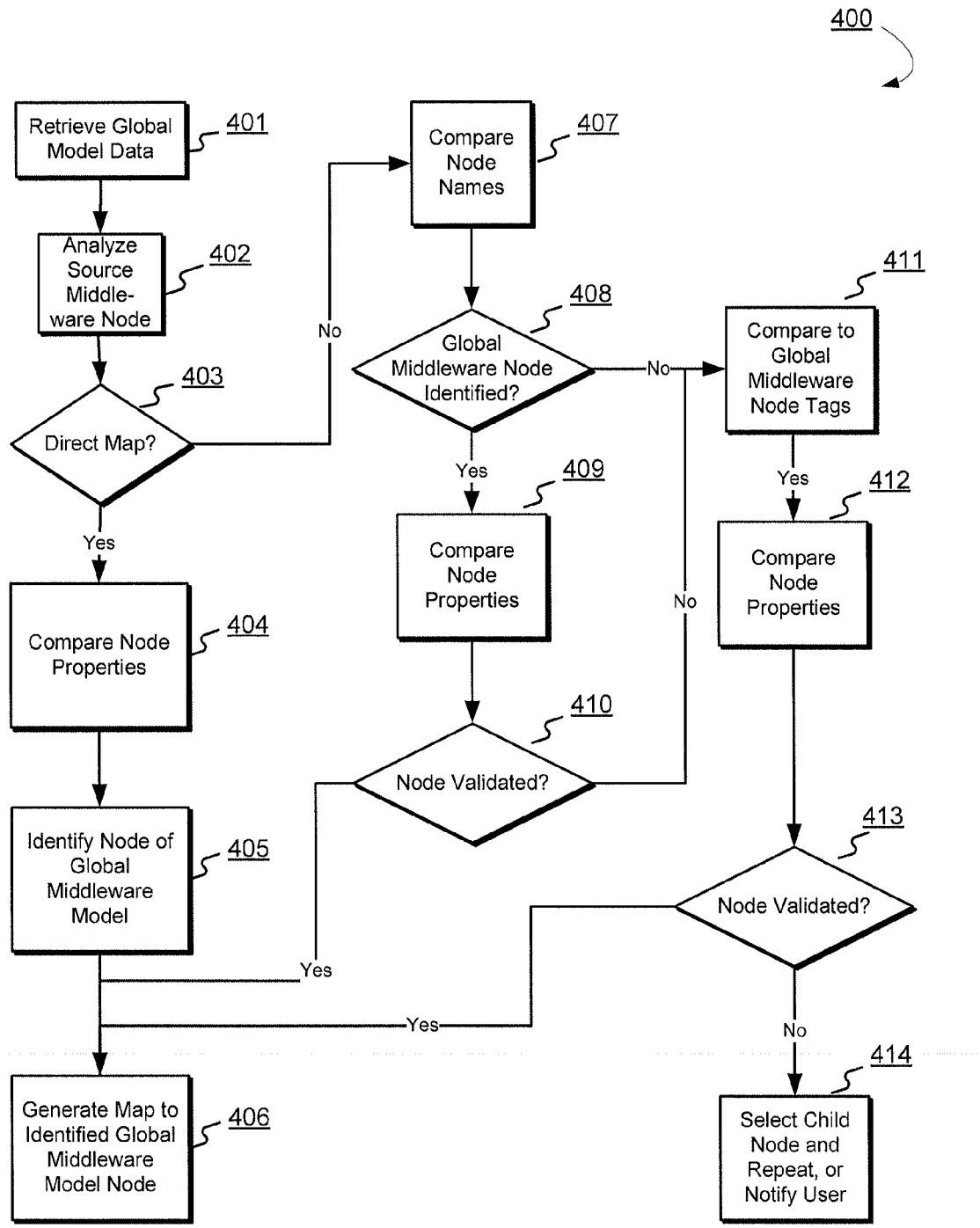
FIG. 4: Exemplary Method for Generating Mapping Instructions

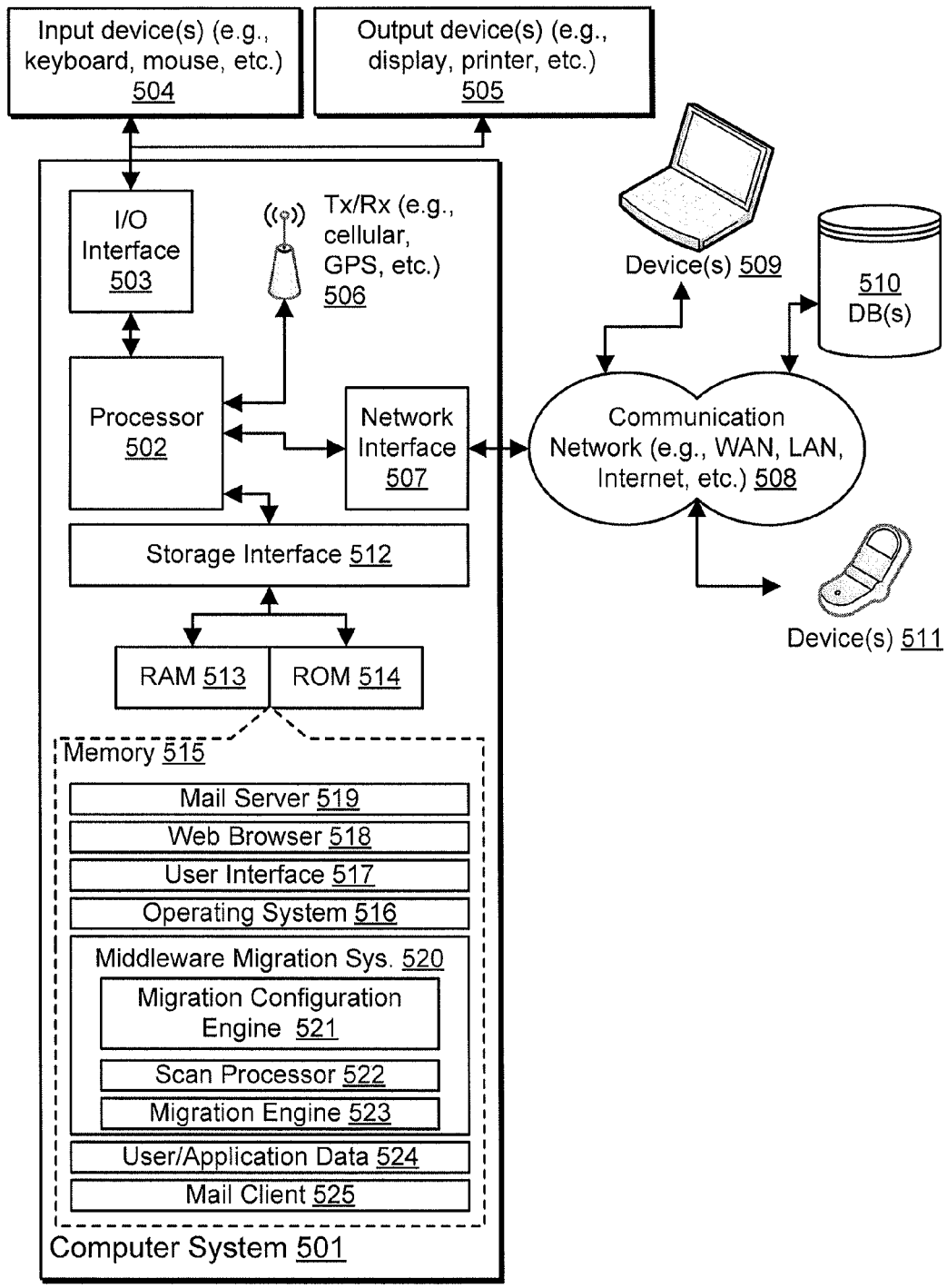
FIG. 5: Example Computer System

METHOD AND SYSTEM FOR MIGRATING AN INTERFACE

PRIORITY CLAIM

This U.S. patent application claims priority under 35 U.S.C. §119 to India Application Number 5840/CHE/2014, filed Nov. 21, 2014, the entire contents of which are incorporated herein by reference.

TECHNICAL FIELD

This disclosure relates generally to middleware interface migration, and more particularly to methods and systems for migrating an interface.

BACKGROUND

Industrial software applications are written on wide variety of middleware platforms. Middleware is computer software that provides services to higher-level software applications by connecting software components or enterprise applications to the other software components or enterprise application. Each middleware platform stores interface information according to its own proprietary format and mechanisms. The interface may comprise building blocks called "nodes." When an organization operates multiple middleware platforms, it may be occasionally necessary to migrate a software interface from one middleware platform to another. Because the nodes of each proprietary platform may be unique to that platform, middleware interfaces may not typically be portable from one platform to another.

A limited number of automated migration tools are available to perform interface migration. However, migration tools used today are limited to small number of platforms on which they operate, and each platform necessitates a different tool for interface migration. An organization operating a variety of platforms may need to purchase and maintain many automated migration tools. Middleware automation software may also provide incorrect links between the nodes of the target middleware platform, which may hinder the integrity of the interface.

Accordingly, it may be advantageous to provide an automated system for migrating an interface from a source middleware platform to a target middleware platform to suit all migration patterns. It may also be advantageous to provide a migration tool that validates the quality of each node linkage.

SUMMARY

In one embodiment, a method of migrating an interface from a source middleware platform to a target middleware platform is disclosed. The method may include discovering, by a processor, types associated with a plurality of source middleware nodes, and discovering one or more links between the plurality of source middleware nodes. The method may further include mapping the plurality of source middleware nodes to nodes of a global middleware model based on the types associated with the plurality of source middleware nodes, wherein the global middleware model comprises a format interoperable between a source middleware platform and a target middleware platform. The method may further include establishing one or more links between the nodes of the global middleware model based on the one or more links between the plurality of source middleware nodes. Also, the method may include migrating the nodes of the global middleware model and the one or more links between the nodes of the global middleware model to the target middleware platform based on mapping the global middleware model to the target middleware platform.

In another embodiment, a system for migrating from a source middleware platform to a target middleware platform is disclosed. The system may comprise one or more hardware processors, and one or more memory devices storing instructions executable by the one or more hardware processors for performing a method. The method may comprise discovering, via the one or more hardware processors, types associated with a plurality of source middleware nodes, and discovering one or more links between the plurality of source middleware nodes. The method may further comprise mapping, via the one or more hardware processors, the plurality of source middleware nodes to nodes of a global middleware model based on the types associated with the plurality of source middleware nodes. In some cases, the global middleware model may comprise a format interoperable between a source middleware platform and a target middleware platform. The method may also comprise establishing, via the one or more hardware processors, one or more links between the nodes of the global middleware model based on the one or more links between the plurality of source middleware nodes. The method may further comprise migrating, via the one or more hardware processors, the nodes of the global middleware model and the one or more links between the nodes of the global middleware model to the target middleware platform based on mapping the global middleware model to the target middleware platform.

In yet another embodiment, a non-transitory computer-readable medium is disclosed, which may store instructions for migrating from a source middleware platform to a target middleware platform. The instructions, when executed, may cause one or more hardware processors to perform a method. The method may comprise discovering, via the one or more hardware processors, types associated with a plurality of source middleware nodes, and discovering one or more links between the plurality of source middleware nodes. The method may further comprise mapping, via the one or more hardware processors, the plurality of source middleware nodes to nodes of a global middleware model based on the types associated with the plurality of source middleware nodes. In some cases, the global middleware model may comprise a format interoperable between a source middleware platform and a target middleware platform. The method may also comprise establishing, via the one or more hardware processors, one or more links between the nodes of the global middleware model based on the one or more links between the plurality of source middleware nodes. The method may further comprise migrating, via the one or more hardware processors, the nodes of the global middleware model and the one or more links between the nodes of the global middleware model to the target middleware platform based on mapping the global middleware model to the target middleware platform.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates a functional block diagram illustrating an exemplary middleware migration system, according to some embodiments of the present disclosure.

FIG. 2 is a flow diagram illustrating an exemplary method for migrating middleware components, in accordance with some embodiments of the present disclosure.

FIG. 3 is a flow diagram illustrating an exemplary method for discovering middleware nodes and links, according to some embodiments of the present disclosure.

FIG. 4 is a flow diagram illustrating an exemplary method for generating mapping instructions in accordance with some embodiments of the present disclosure.

FIG. 5 is a block diagram of an exemplary computer system according to some embodiments of the present disclosure.

DETAILED DESCRIPTION

Exemplary embodiments are described regarding the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described, modifications, adaptations, and other implementations are possible without departing from the spirit and scope of the disclosed embodiments. It is intended that the following detailed description be considered as exemplary only, with the true scope and spirit being indicated by the following claims.

Business enterprises commonly use a variety of software platforms within the same organization. When an enterprise wishes to adopt an alternate middleware platform, migration of interfaces from one middleware platform to another may be necessary. Interfaces of middleware platforms may include building block nodes that may include mediator flows, routing rules, adapter configurations, transformation components, etc. Most interfaces include multiple nodes, which may be connected by "links."

Middleware platforms may each have a unique proprietary format and mechanism by which they design and store interfaces. Middleware platforms may include varieties, such as, for example, Websphere Message Broker, Oracle Service Bus, RedHat JBoss Fuse and so on. Two widely followed standards have evolved: some middleware platforms follow a linear-component-model (LCM), and others follow hierarchical-design-model (HDM). Migration from one platform (for example, HDM) to another (for example, LCM) is technically complex regarding interpretation and mapping between the source interface and the target interface. For example, when mapping from an HCM, with nodes aligned in a parent-child relationship, to an LCM, with nodes aligned in a sequential relationship, each category of node for both the source format and the target format must be discovered, analyzed, and mapped. Node format, node type, and the node nomenclature used in representing a node in one middleware may differ from the format, type and nomenclature used in another middleware. Due to these variations in data representation schemes, discovery and categorization of node types introduces additional complexity. After the maps are made and the links are created, most nodes of a middleware interface should be successfully linked with its predecessor node. Considering the large number of nodes in a middleware interface and the wide variety of different middleware linking mechanisms, there are many possibilities for incorrect linking, which may compromise the end product.

Accordingly, it may be advantageous to provide systems and methods for migrating interfaces of middleware platforms. It may also be advantageous to provide methods and systems for checking the integrity of the links, and for maintaining the relationship between nodes in the interoperable form.

In one aspect, an exemplary migration system may generally work by determining information about the source middleware platform, and identifying the nodes of an interface in the source middleware. After identifying the nodes, the migration system may map each node of the source middleware platform to an interoperable format (for example, a global middleware model) for each of the nodes in the source middleware platform, and establish a link with one or more of a plurality of upstream nodes. After mapping and linking, the migration system may store the map in a computer memory.

FIG. 1 depicts a functional block diagram illustrating an exemplary middleware migration system 100 (hereafter "migration system 100"). Migration system 100 may include a migration configuration engine 101 (hereafter "configuration engine 101"). Configuration engine 101 may be configured to cause an operatively connected computer processor (for example, processor 502, as depicted in FIG. 5) to request user input regarding one or more of the source platform and the target platform. Configuration engine 101 may also cause processor 502 to prompt for and receive information in connection with global middleware model 103, and to save the information to an operably connected computer-readable memory (e.g., memory 515). For example, configuration engine 101 may cause processor 502 to request information from a user (not shown) by outputting a prompt on an operatively connected output device (e.g., output device 505, as depicted in FIG. 5). Processor 502 may receive information (e.g., user input) in response to the prompt, and store the information received to an operatively connected computer memory (for example, middleware migration system 520, as depicted in FIG. 5, and configured as part of memory 515). Configuration engine 101 may request information in connection with one or more data repositories, such as, for example, a network location, an internet protocol (IP) address, a repository characteristic, such as, for example, repository capacity, etc. According to one aspect, configuration engine 101 may receive user input in connection with the data repositories such as, for example, data store 510.

Migration system 100 may include a global middleware model 103. Global middleware model 103 may be a universal data structure configured to accommodate information in connection with a plurality of middleware formats. "Global" as used herein refers to the interoperability of global middleware model 103, with respect to the information regarding each of the plurality of middleware platforms to which the model may be universal. Accordingly, global middleware model 103 may include "universal" data. Universal data may include one or more data structures configured to organize information in connection with each of a plurality of middleware. For example, global middleware model 103 may include nodal relationships for any one or more source middleware, and how each of these nodal relationships are related to each node of a target middleware platform. For example, global middleware model 103 may contain information for each node of a source platform. The information for each node of a source platform may include, for example, a description of a particular node, one or more node properties, one or more categories of a node (e.g., a transformation node, an adapter node etc.), one or more metadata in connection with keyword tags, indices of the node information, and/or other properties. Those skilled in the art understand that a node may include a wide variety of information and properties regarding the use and/or configuration of the particular node, although not explicitly listed herein.

In one aspect, scan processor 104 may cause processor 502 to determine information in connection with the platform to be scanned. Based on the one or more configuration parameters 102, scan processor 104 may invoke an scanner from a plurality of scanners to scan the repository and the source platform interface data stored on the repository with the scanner program. An example of a repository may be data store 510. Information used by processor 502 to select a scanner may include one or more adapter configurations, one or more transformation rules, one or more mediator flows, one or more routing rules, one or more validation rules and/or one or more system details. Other information by which an appropriate scanner program may be chosen are contemplated, although not expressly stated herein.

In one aspect, migration system 100 may further include a scan processor 104. Scan processor 104 may configure an operatively connected computer processor (e.g., processor 502) to determine information regarding one or more data stores (e.g., data store 510, as depicted in FIG. 5) on which the source platform and/or the target platforms may be located. Scan processor 104 may cause processor 502 to discover a type associated with each of a plurality of source middleware nodes and one or more links between the plurality of source middleware nodes. Each of the plurality of source middleware nodes and the one or more links may be associated with the interface. Scan processor 104 may also cause processor 502 to discover a type associated with each of the plurality of source middleware nodes and the one or more links between the plurality of source middleware nodes. The plurality of source middleware nodes and the one or more links may be associated with the interface. The type associated with each of the plurality of source middleware nodes and the one or more links between the plurality of source middleware nodes may be based on one or more properties associated with each node of the plurality of source middleware nodes. Scan processor 104 may also access configuration information, such as, for example, configuration parameters 102.

Migration system 100 may include a migration engine 105. Migration engine 105 may include a node Identifier 108, which may be configured to cause processor 502 to analyze the scanned information provided by scan processor 104, and identify one or more properties of each node, such as, for example, the type associated with each of the plurality of middleware nodes and one or more links between the nodes. Scan processor 104 may also determine whether the particular node is a transformation node, an adapter node etc. Node identifier 108 may be configured to cause processor 502 to perform a comparison of identified nodes in the source middleware platform with universal information in global middleware model 103. Global middleware model 103 may include a format interoperable between the source middleware platform and the target middleware platform. For example, source middleware platforms and target middleware platforms, discussed further below, may be heterogeneous. As an illustration, a source middleware platform may comprise a JAVA-based platform, while a corresponding target middleware platform, obtained via Global middleware model 103, may comprise a .NET-based platform. In alternate embodiments, a source middleware platform and a corresponding target middleware platform may both comprise a JAVA-based platform, but may embody two different versions of a JAVA-based platform. Such source and target middleware platforms may be considered homogeneous with respect to each other. Thus, in some embodiments, Global middleware model 103 may include a format interoperable between various source and target middleware platforms. In some embodiments, any type or version of a source middleware platform may be mapped into a platform-, platform type-, and/or platform version-agnostic model using Global middleware model 103. Node identifier 108 may cause processor 502 to map the nodes based on, at least in part, the type associated with each source middleware node discovered by scan processor 104. The interoperable format of Global middleware model 103 may include, for example, information that may be used to map the plurality of source middleware nodes to nodes of global middleware model 103.

Migration engine 105 may also include a map processor 106. Map processor 106 may work in conjunction with processor 502, and be configured to cause processor 502 to identify an equivalent node in global middleware model 103 for every node of source middleware using information from node identifier 108. Map processor 106 may be further configured to cause processor 502 to map the nodes of the source middleware platform to global middleware model 103. As used herein, a "mapping" process may include analyzing one or more nodes of the source middleware platform, and identifying corresponding nodes of the global middleware model. In some instances, map processor 106 may cause processor 502 to determine whether each particular node has a direct mapping to a corresponding node on the global middleware model 103. In other instances, map processor 106 may perform a more nuanced analysis, where the mapping is indirect, to identify global middleware model nodes corresponding to nodes of the source middleware platform, as explained further below.

Migration engine 105 may further include a link processor 107. Link processor 107 may work in conjunction with processor 502, by causing processor 502 to generate a set of mapping instructions specifying links between the nodes of the global middleware model. Link processor 107 may cause processor 502 to establish, via an iterative process, one or more links between the nodes of the global middleware model based on the one or more links between the plurality of source middleware nodes.

After mapping a node of the source middleware platform to a corresponding node of the global middleware model, the link processor 107 may link the mapped node in the global middleware model to an upstream node of the global middleware model, e.g., a node mapped from the source middleware platform in an earlier iteration. For example, in a first iteration, a global middleware model node 1 may be mapped from a source middleware platform to the global middleware model. In a second iteration, a global middleware model node 2 may be mapped from the source middleware platform to the global middleware model. While linking, node 1 may be considered as an upstream node for node 2. In some embodiment, linking of nodes may be performed based on the type of current node, and an equivalent linking in the source middleware platform. Such an iterative process may be repeated for all nodes in an interface and for all interfaces in the source middleware platform.

Middleware migration system 100 may migrate middleware interface between a variety of types of middleware platforms. For example, according to some embodiments, the source middleware platform and the target middleware platform may be homogeneous. Accordingly, both the target middleware platform and the source middleware platform may be the same type of platform, but different versions of the same type. In other embodiments, the source middleware platform and the target middleware platform may be heterogeneous. Accordingly, the target middleware platform and the source middleware platform may be different types of platforms.

Migration engine 105 may also include a link integrity engine 109 configured to validate, via processor 502, integrity of one of the links between the nodes of the global middleware model. The links may be checked after mapping and prior to establishing the links, or checked after the links are established in the global middleware model. If link integrity engine 109 determines any aberration in the links between the nodes of the global middleware model, link integrity engine 109 may cause processor 502 to repeat the scan, mapping, and linking processes described earlier. Subsequent failures may be intimated to user via an output device, such as, for example, output device 505, as depicted in FIG. 5.

FIG. 2 is depicts a flow diagram illustrating an exemplary method 200 for migrating middleware nodes, in accordance with some embodiments of the present disclosure. In one aspect, method 200 may commence with discovering middleware nodes and links (step 201). Discovering middleware nodes and links (step 201) is discussed in more detail in FIG. 3.

Referring to FIG. 3, a flow diagram illustrating an exemplary method for discovering middleware nodes and links is provided, according to some embodiments of the present disclosure. At step 301, configuration engine 101 may output a message prompt for user input regarding the global middleware model 103. Information requested from the user may include a middleware platform location, type of middleware platform, one or more migration settings, etc. Accordingly, configuration engine 101 may receive the input, and store the input as configuration parameters 102. For example, configuration parameters may include information related to repository location. Repository location can be a file location, database location, or any other persistence mechanism. If multiple locations are involved for a given middleware, multiple locations in sequence order may be obtained from the user.

At step 302, scan processor 104 may identify one or more repository scanners. In one aspect, scan processor 104 may determine, based on information learned by configuration engine 101, one or more scanners (or more particularly, scanner programs) that may be useful in scanning the repository to identify source platform interface data. In another aspect, the scan processor 104 may select one or more scanner programs based on a discovered source middleware node. For example, configuration engine 101 may determine that one of the source middleware nodes utilizes a particular data structure. Scan processor 104 may, based on the data structure information, cause processor 502 to select one or more particular scanner programs appropriate for scanning the repository. At step 303, the scanner programs may be instantiated to scan the repository for source middleware platform interface data.

At step 304, configuration engine 101 may identify source middleware nodes by causing processor 502 to conduct an analysis of scanned information. For example, configuration engine 101 may parse the scanned information from the repository and determine information in connection with the source middleware, such as, for example, the type of source middleware, the middleware creator (programmer, company, etc.), the proprietary name, the programming language associated with the source middleware, etc. Configuration engine 101 may also automatically determine the information in connection with the source middleware by identifying the type associated with each of the plurality of source middleware nodes. Configuration engine 101 may also automatically determine one or more links between the plurality of source middleware nodes.

Referring again to FIG. 2, after discovering middleware nodes and links (step 201) migration system 100 may generate a mapping of the nodes of the source middleware platform to the nodes of the global middleware model (step 202). FIG. 4 depicts a flow diagram illustrating an exemplary mapping method, in accordance with some embodiments of the present disclosure.

Referring now to FIG. 4, in some embodiments, the properties of an identified source middleware platform node may be mapped to corresponding nodes of the global middleware model by a series of steps. At step 401, nodes of the global middleware model may be identified. At step 402, a node of the source middleware platform may be picked, and analyzed to identify a corresponding node of the global middleware model. In some instances, direct mapping may be possible (see, e.g., step 403). At step 404, for each node of the source middleware platform, the migration system 100 may compare properties of the source middleware platform node with those of node types in the global middleware model. At step 405, based on the comparison, the migration system 100 may identify a relevant node in the global middleware model using type information associated with the source middleware platform node. After identifying the relevant global middleware model node, at step 406, the property values along with node values stored in the node may be mapped to relevant properties and node values of the global middleware model node.

For nodes where the direct mapping is not feasible, a series of steps may be performed. At step 407, node names of the source middleware platform may be compared against the names of nodes of the global middleware model to identify the similarity of nomenclature of a node in the global middleware model to the node of the source middleware platform. If a node in the global middleware model is identified (see step 408), then the identified global middleware model node may be validated, at step 409, by comparing the node properties of the source middleware platform against the properties of the corresponding node in the global middleware model. If this property validation is successful (see step 410), the identified node of the global middleware model is used for mapping node properties (see step 406). If the property validation fails, then additional steps may be performed, as detailed below.

If no node is identified that passes the property validation step above (see steps 408 and 410), then, at step 411, the node name of the source middleware platform may be compared against the tags of the nodes in the global middleware model. If a corresponding global middleware model node is identified then, it may be validated based on properties of the source middleware platform node compared against the identified node of the global middleware model (see step 412). If this property validation is successful, the identified node of the global middleware model is used for mapping node properties.

If no node is identified still, or if property validation fails, then the set of properties of this node in the source middleware platform may be compared against the properties of nodes of the global middleware model for similarity identification. If similarity is found (see step 413), then the identified similar node of the global middleware model may be used as the node corresponding to the node of the source middleware platform.

If no node is still identified, at step 414, child nodes of the concerned source middleware platform node will be picked instead, and the above procedure to identify a corresponding global middleware model node may be repeated for the child node of the source middleware platform (e.g., starting from step 402). If a corresponding child node is identified in the global middleware model corresponding to the child node of the source middleware platform, the parent node of the identified global middleware mode child node will be used for mapping corresponding to the parent node of the child node in the source middleware platform.

For non-root nodes (e.g., nodes that have a parent node), the position of nodes in source middleware platform may be used to identify a node in the global middleware model by leveraging the position of nodes in the global middleware model.

If no mapping is still found, migration system 100 may notify the user, and processing may move to other nodes of the source middleware platform.

Referring again to FIG. 2, after mapping the plurality of source middleware nodes to nodes of the global middleware model, migration system 100 may establish the links (step 203) between the nodes of the global middleware model based on the one or more links between the plurality of source middleware nodes. At step 204, link integrity engine 109 may check for integrity of one of the one or more links between the nodes of the of the global middleware model. In one aspect, integrity engine may validate the link integrity using, at least in part, the mapped node properties, which may include the number of nodes mapped. Accordingly, if map processor 106, link processor 107, and node identifier 108 have generated valid link instructions, link integrity engine 109 may determine a relative integrity score for each link. For example, link integrity engine 109 may analyze the node properties of the global middleware model node, and make a determination whether or not the integrity of each link falls within a predetermined range as compared with comparable scores determined by analyzing the source middleware platform. Each node may be verified for integrity if the analysis score falls within the predetermined range.

Migration system 100 may then migrate the nodes of the global middleware model and the one or more links between the nodes of the global middleware model to the target middleware platform (step 205). Migration system 100 may save the target middleware platform mapping on an operatively connected computer-readable medium.

In some embodiments, migration system 100 may engage in fractional mapping of nodes of the global middleware model to the nodes in the target middleware platform. For example, a single node of the global middleware model may map, based on identifying a node configuration in the target platform that accomplishes similar functionality, to two or more nodes in the target middleware model. As another example, two or more nodes of the global middleware model may map, based on identifying a node configuration in the target platform that accomplishes similar functionality, to a single node in the target middleware model. As still another example, two or more nodes of the global middleware model may map, based on identifying a node configuration in the target platform that accomplishes similar functionality, to two or more nodes in the target middleware model (e.g., two global middleware model nodes mapping to three target middleware platform nodes). In general, M nodes of the global middleware model may map, based on identifying a node configuration in the target platform that accomplishes similar functionality, to N nodes in the target middleware model, where M and N lie within the set of all integers.

Computer System

FIG. 5 is a block diagram of an exemplary computer system for implementing embodiments consistent with the present disclosure. Variations of computer system 501 may be used for implementing the middleware migration system. Computer system 501 may comprise a central processing unit ("CPU" or "processor") 502. Processor 502 may comprise at least one data processor for executing program nodes for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as, for example, AMD Athlon, Duron or Opteron, ARM's application, embedded or secure processors, IBM PowerPC, Intel's Core, Itanium, Xeon, Celeron or other line of processors, etc. Processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with data store 510, and/or devices 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, data store 510.

The memory devices may store a collection of program or database components, including, without limitation, an operating system 516, user interface 517, web browser 518, mail server 519, mail client 525, user/application data 524 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 519 stored program component. The mail client may be a mail viewing application, such as Apple Mail, Microsoft Entourage, Microsoft Outlook, Mozilla Thunderbird, etc.

In some embodiments, computer system 501 may store user/application data 524, such as the data, variables, records, etc. (e.g., a data repository, node properties, mapped node properties, etc.) as described in this disclosure. Computer system 501 may also store application data including a middleware migration system 520, comprising a migration configuration engine 521, a scan processor 522, and/or a migration engine 523. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for migrating an interface. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method of migrating from a source middleware platform to a target middleware platform, comprising:
    discovering, via one or more hardware processors, types associated with a plurality of source middleware nodes;
    discovering, via the one or more hardware processors, one or more links between the plurality of source middleware nodes;
    mapping, via the one or more hardware processors, the plurality of source middleware nodes to nodes of a global middleware model based on the types associated with the plurality of source middleware nodes;
    wherein the global middleware model comprises a format interoperable between a source middleware platform and a target middleware platform;
    establishing, via the one or more hardware processors, one or more links between the nodes of the global middleware model based on the one or more links between the plurality of source middleware nodes; and
    migrating, via the one or more hardware processors, the nodes of the global middleware model and the one or more links between the nodes of the global middleware model to the target middleware platform based on mapping the global middleware model to the target middleware platform.

2. The method of claim 1, further comprising:
    identifying, via the one or more hardware processors, the source middleware platform based on a repository structure storing interface information for the source middleware platform.

3. The method of claim 1, wherein the source middleware platform and the target middleware platform are one of: heterogeneous; and include different versions of a homogeneous middleware platform.

4. The method of claim 1, wherein discovering the types associated with the plurality of source middleware nodes is based on one or more properties associated with the plurality of source middleware nodes.

5. The method of claim 1, wherein mapping the plurality of source middleware nodes to the nodes of the global middleware model comprises:
    comparing a name of one of the source middleware nodes with at least one of:
        a name of a compared node of the global middleware model, or
        a tag associated with the compared node of the global middleware model; and
    identifying a nomenclature similarity between the name of the one of the source middleware nodes and the name of, or the tag associated with, the compared node of the global middleware model.

6. The method of claim 1, wherein mapping the plurality of source middleware nodes to the nodes of the global middleware model further comprises:
    comparing one or more properties associated with the one of the source middleware nodes with one or more properties associated with the compared node of the global middleware model; and
    identifying a similarity between the one or more properties associated with the one of the source middleware nodes and the one or more properties associated with the compared node of the global middleware model.

7. The method of claim 1, wherein mapping the plurality of source middleware nodes to the nodes of the global middleware model is based on a position of one or more source middleware nodes.

8. A system for migrating from a source middleware platform to a target middleware platform, comprising:
    one or more hardware processors; and
    one or more memory devices storing instructions executable by the one or more hardware processors for:
        discovering, via the one or more hardware processors, types associated with a plurality of source middleware nodes;
        discovering, via the one or more hardware processors, one or more links between the plurality of source middleware nodes;
        mapping, via the one or more hardware processors, the plurality of source middleware nodes to nodes of a global middleware model based on the types associated with the plurality of source middleware nodes;
        wherein the global middleware model comprises a format interoperable between a source middleware platform and a target middleware platform;
        establishing, via the one or more hardware processors, one or more links between the nodes of the global middleware model based on the one or more links between the plurality of source middleware nodes; and
        migrating, via the one or more hardware processors, the nodes of the global middleware model and the one or more links between the nodes of the global middleware model to the target middleware platform based on mapping the global middleware model to the target middleware platform.

9. The system of claim 8, the one or more memory devices further storing instructions for:
    identifying, via the one or more hardware processors, the source middleware platform based on a repository structure storing interface information for the source middleware platform.

10. The system of claim 8, wherein the source middleware platform and the target middleware platform are one of: heterogeneous; and include different versions of a homogeneous middleware platform.

11. The system of claim 8, wherein discovering the types associated with the plurality of source middleware nodes is based on one or more properties associated with the plurality of source middleware nodes.

12. The system of claim 8, wherein mapping the plurality of source middleware nodes to the nodes of the global middleware model comprises:

comparing a name of one of the source middleware nodes with at least one of:
  a name of a compared node of the global middleware model, or
  a tag associated with the compared node of the global middleware model; and
identifying a nomenclature similarity between the name of the one of the source middleware nodes and the name of, or the tag associated with, the compared node of the global middleware model.

13. The system of claim 8, wherein mapping the plurality of source middleware nodes to the nodes of the global middleware model further comprises:
comparing one or more properties associated with the one of the source middleware nodes with one or more properties associated with the compared node of the global middleware model; and
identifying a similarity between the one or more properties associated with the one of the source middleware nodes and the one or more properties associated with the compared node of the global middleware model.

14. The system of claim 8, wherein mapping the plurality of source middleware nodes to the nodes of the global middleware model is based on a position of one or more source middleware nodes.

15. A non-transitory computer-readable medium storing instructions for migrating from a source middleware platform to a target middleware platform, the instructions comprising instructions for:
discovering, via one or more hardware processors, types associated with a plurality of source middleware nodes;
discovering, via the one or more hardware processors, one or more links between the plurality of source middleware nodes;
mapping, via the one or more hardware processors, the plurality of source middleware nodes to nodes of a global middleware model based on the types associated with the plurality of source middleware nodes;
wherein the global middleware model comprises a format interoperable between a source middleware platform and a target middleware platform;
establishing, via the one or more hardware processors, one or more links between the nodes of the global middleware model based on the one or more links between the plurality of source middleware nodes; and
migrating, via the one or more hardware processors, the nodes of the global middleware model and the one or more links between the nodes of the global middleware model to the target middleware platform based on mapping the global middleware model to the target middleware platform.

16. The medium of claim 15, the medium further storing instructions for:
identifying, via the one or more hardware processors, the source middleware platform based on a repository structure storing interface information for the source middleware platform.

17. The medium of claim 15, wherein discovering the types associated with the plurality of source middleware nodes is based on one or more properties associated with the plurality of source middleware nodes.

18. The medium of claim 15, wherein mapping the plurality of source middleware nodes to the nodes of the global middleware model comprises:
comparing a name of one of the source middleware nodes with at least one of:
  a name of a compared node of the global middleware model, or
  a tag associated with the compared node of the global middleware model; and
identifying a nomenclature similarity between the name of the one of the source middleware nodes and the name of, or the tag associated with, the compared node of the global middleware model.

19. The medium of claim 15, wherein mapping the plurality of source middleware nodes to the nodes of the global middleware model further comprises:
comparing one or more properties associated with the one of the source middleware nodes with one or more properties associated with the compared node of the global middleware model; and
identifying a similarity between the one or more properties associated with the one of the source middleware nodes and the one or more properties associated with the compared node of the global middleware model.

20. The medium of claim 15, wherein mapping the plurality of source middleware nodes to the nodes of the global middleware model is based on a position of one or more source middleware nodes.

* * * * *